United States Patent
Snyder et al.

(10) Patent No.: US 7,761,548 B2
(45) Date of Patent: Jul. 20, 2010

(54) DYNAMIC SERVER CONSOLIDATION AND RATIONALIZATION MODELING TOOL

(75) Inventors: Marc E. Snyder, Sudbury, MA (US); Richard M. Melnicoff, Menlo Park, CA (US); Bogdan Konsur, Highland Park, IL (US); Jessica Long, Chicago, IL (US); Charles Heo, Plano, TX (US); Timothy Bainter, St. Louis, MO (US); James Steele, San Francisco, CA (US); Edward M. Schall, San Francisco, CA (US)

(73) Assignee: Accenture Global Services GmbH (CH)

( * ) Notice: Subject to any disclaimer, the term of this patent is extended or adjusted under 35 U.S.C. 154(b) by 838 days.

(21) Appl. No.: 11/552,422

(22) Filed: Oct. 24, 2006

(65) Prior Publication Data
US 2007/0094375 A1 Apr. 26, 2007

Related U.S. Application Data

(60) Provisional application No. 60/730,235, filed on Oct. 24, 2005.

(51) Int. Cl.
*G06F 15/173* (2006.01)
(52) U.S. Cl. ............... 709/223; 709/224; 709/225; 709/227; 718/100; 718/105; 702/182
(58) Field of Classification Search ................. 709/223
See application file for complete search history.

(56) References Cited

U.S. PATENT DOCUMENTS 5,802,291 A * 9/1998 Balick et al. ............... 709/202
6,219,654 B1 * 4/2001 Ruffin ......................... 705/400
7,533,385 B1 * 5/2009 Barnes ........................ 718/104
2002/0069369 A1 * 6/2002 Tremain ..................... 713/201
2002/0082811 A1 * 6/2002 Honjas et al. .................. 703/2
2003/0191810 A1 * 10/2003 Muhlestein et al. ......... 709/215
2005/0262504 A1 * 11/2005 Esfahany et al. ............... 718/1
2006/0095309 A1 * 5/2006 Mangan et al. ............... 705/8
2006/0235859 A1 * 10/2006 Hardwick et al. ........... 707/100
2006/0282825 A1 * 12/2006 Taylor ........................ 717/127
2007/0094367 A1 * 4/2007 Esfahany et al. ............ 709/223
2007/0094375 A1 * 4/2007 Snyder et al. ............... 709/223
2008/0281967 A1 * 11/2008 Muhlestein et al. ......... 709/226

OTHER PUBLICATIONS

Chen, The Design of High Availablity in the Dawning Server Consolidation System, 2000, IEEE.*
Spellman, Server Consolidation Using Performance Modeling, 2003, IEEE.*

* cited by examiner

*Primary Examiner*—Aaron Strange
*Assistant Examiner*—Arvin Eskandarnia
(74) *Attorney, Agent, or Firm*—Fish & Richardson P.C.

(57) ABSTRACT

A method and system for providing efficient and flexible techniques for modeling technical and economic benefits of consolidating information technology (IT) systems, hardware, software, network, and other infrastructure are described. The system includes a data processing system configured to receive data from a user. The system also includes an input collection system communicatively coupled to the data processing system, with the input collection system designed to organize, convert, and sort the data to generate baseline server information. In addition, the system includes an optimization system communicatively coupled to the data processing system, with the optimization system designed to generate one or more server consolidation models based on the baseline server information. Further, based on the generated one or more server consolidation models, a recommendation can be generated.

49 Claims, 12 Drawing Sheets

| | Baseline Adjustment | | | 0% | |
|---|---|---|---|---|---|
| Adjusted Server Counts | Linux | Other | Unix | Windows | Total |
| Applications Server | 97 | 176 | 513 | 1,829 | 2,615 |
| Video Servers | 0 | 0 | 0 | 11 | 11 |
| Client/Server Thin | 2 | 10 | 23 | 271 | 306 |
| Database Server | 41 | 18 | 342 | 649 | 1,050 |
| Email Servers | 8 | 29 | 8 | 373 | 418 |
| FTP | 3 | 3 | 18 | 17 | 41 |
| File Servers | 30 | 59 | 65 | 660 | 814 |
| Network Management | 30 | 45 | 105 | 641 | 821 |
| Other | 72 | 122 | 237 | 1,057 | 1,488 |
| Print Servers | 0 | 5 | 2 | 88 | 95 |
| Remote Access | 3 | 3 | 24 | 79 | 109 |
| Web Services | 10 | 5 | 22 | 82 | 119 |
| Client/Server Thick | 0 | 1 | 14 | 64 | 79 |
| Voice Servers | 0 | 0 | 0 | 9 | 9 |
| Web Server | 64 | 18 | 95 | 881 | 1,058 |
| | 360 | 494 | 1,468 | 6,711 | 9,033 |

FIG. 3

| Useable CPUs required at 100% utilization | | | | | Revised CPU Count | | | |
|---|---|---|---|---|---|---|---|---|
| | Linux | Other | UNIX | Windows | | Linux | Other | UNIX | Windows |
| | 3 GHz CISC | 1.9 GHz RISC | 1.9 GHz RISC | 3 GHz CISC | Scaling | 3 GHz CISC | 1.9 GHz RISC | 1.9 GHz RISC | 3 GHz CISC |
| Applications Server | 161 | 61 | 718 | 2,061 | 100% | 161 | 61 | 718 | 2,061 |
| Video Servers | 0 | 0 | 0 | 9 | 100% | 0 | 0 | 0 | 9 |
| Client/Server Thin | 2 | 4 | 78 | 372 | 100% | 2 | 4 | 78 | 372 |
| Database Server | 64 | 18 | 753 | 890 | 100% | 64 | 18 | 753 | 890 |
| Email Servers | 6 | 9 | 7 | 382 | 100% | 6 | 9 | 7 | 382 |
| FTP | 2 | 0 | 11 | 9 | 100% | 2 | 0 | 11 | 9 |
| File Servers | 30 | 22 | 34 | 502 | 100% | 30 | 22 | 34 | 502 |
| Network Management | 17 | 17 | 87 | 504 | 100% | 17 | 17 | 87 | 504 |
| Other | 70 | 89 | 224 | 1,080 | 100% | 70 | 89 | 224 | 1,080 |
| Print Servers | 0 | 2 | 0 | 96 | 100% | 0 | 2 | 0 | 96 |
| Remote Access | 2 | 1 | 27 | 84 | 100% | 2 | 1 | 27 | 84 |
| Web Services | 11 | 3 | 49 | 82 | 100% | 11 | 3 | 49 | 82 |
| Client/Server Thick | 0 | 0 | 13 | 72 | 100% | 0 | 0 | 13 | 72 |
| Voice Servers | 0 | 0 | 0 | 5 | 100% | 0 | 0 | 0 | 5 |
| Web Server | 82 | 8 | 129 | 958 | 100% | 82 | 8 | 129 | 958 |
| TOTAL | 446 | 235 | 2,131 | 7,109 | | 446 | 235 | 2,131 | 7,109 |

FIG. 4

| | Linux | Other | Unix | Windows |
|---|---|---|---|---|
| Current Servers | 64 | 18 | 95 | 881 |
| Ability to be consolidated | | | | |
| % of servers that can be consolidated | 80% | 80% | 80% | 80% |
| Servers consolidated | 51 | 14 | 76 | 705 |
| Servers not consolidated | 13 | 4 | 19 | 176 |
| Normalized current capacity | | | | |
| Raw required capacity (CPUs) | 82 | 8 | 129 | 958 |
| Raw capacity excluding unconsolidated servers (CPUs) | 66 | 6 | 103 | 767 |
| Utilization | | | | |
| Current utilization | 15% | 15% | 15% | 10% |
| Peak average CPU utilization design point | 60% | 60% | 60% | 60% |
| Capacity adjusted for utilization (CPUs) | 16 | 2 | 26 | 128 |
| Workload adjustments | | | | |
| Fragmentation of workload | 15% | 15% | 15% | 15% |
| Capacity adjusted for workload fragmentation (CPUs) | 19 | 2 | 30 | 150 |
| High Availability Overhead % | 25% | 25% | 25% | 25% |
| CPUs with failover | 24 | 2 | 38 | 188 |
| Contingency to allow for error in capacity measurement | 20% | 20% | 20% | 10% |
| Total CPUs required to run the aggregate Web workload from existing environment | 29 | 3 | 45 | 207 |
| Physical and Logical Servers | | | | |
| Current Physical Servers that can be consolidated | 51 | 14 | 76 | 705 |
| % of physical servers with multiple OS (current virtualization) | 0% | 0% | 0% | 0% |
| Current Logical servers | 51 | 14 | 76 | 705 |
| Workload consolidation factor (reduction of logical servers) | 60% | 60% | 60% | 60% |
| Future logical servers after workload consolidation | 20 | 6 | 30 | 282 |
| Number of CPU's per logical server | 1.4 | 0.5 | 1.5 | 0.7 |
| Virtual server applicability | Yes | Yes | Yes | Yes |
| Number of CPU's per physical server | 8 | 8 | 8 | 8 |
| Server class required | Medium | Medium | Medium | Medium |
| Physical servers required for consolidated servers | 4 | 1 | 6 | 26 |
| Target environment for unconsolidated servers | | | | |
| Number of CPU's per physical server | 2 | 2 | 2 | 2 |
| Server class required | Small | Small | Small | Small |
| Physical servers required for unconsolidated servers | 13 | 4 | 19 | 176 |
| Logical servers required for unconsolidated servers | 13 | 4 | 19 | 176 |
| Total physical servers in target environment | 17 | 5 | 25 | 202 |
| Total logical servers in target environment | 33 | 9 | 49 | 458 |
| Percent of physical servers reduced | 74% | 74% | 74% | 77% |
| Percent of logical servers reduced | 48% | 48% | 48% | 48% |

FIG. 6

DYNAMIC SERVER CONSOLIDATION AND RATIONALIZATION MODELING TOOL

This application claims the benefit of the filing date of U.S. Provisional Application No. 60/730,235, filed Oct. 24, 2005, the contents of which are incorporated by reference as part of this application.

BACKGROUND & SUMMARY

The present disclosure relates to information technology (IT) systems and infrastructure, including operating system software, hardware, and networks, and to strategies and techniques employed in planning consolidation and/or configuration of technical infrastructure such as computer networks particularly allowing to estimate the business benefits of consolidation and/or rationalization of such infrastructure.

With the continued advances in technologies across the board, satisfying IT requirements often is an important consideration in improving and maintaining efficient operations of various activities across the globe and across industries. Due to economics and technologies prevailing at particular times in the past, many companies typically have adopted IT systems built on a distributed server-based computing mode. This often led companies simply to add new servers (typically, a combination of physical computer and associated software) to meet growing computing needs as the companies grew organically, or through acquisitions and mergers. While incrementally growing such systems may have been effective in short-term, over time these practices have led to an inefficient accumulation of excess infrastructure. Companies tend to became saddled with excess servers, related components, and different platforms running on the servers with various proprietary software products.

SUMMARY

The present inventors recognized that conventional IT systems built on a distributed server-based computing model suffers from various deficiencies. For example, in conventional IT systems, servers and/or components typically are spread across numerous physical locations adding to the challenge of effectively managing these IT systems. Often, server environments exhibit one or more of poor utilization, unnecessary redundancy, inadequate support, lack of hardware and platform standards, unacceptable downtime, and poor performance. In addition, the decision-making process in technology investments and deployments among individual divisions and offices typically proceeds without strong centralized direction or planning for overall efficiency of the IT system. Thus, in most cases, it may be difficult to measure accurately the total cost to the companies in maintaining, updating, and networking these servers.

In recognition of the difficulties posed by the conventional IT systems, the present inventors have developed, inter alia, a process and system for providing consolidation and rationalization of server-related infrastructure including operating systems, hardware and software, processing and storage, networks, and other facilities. Certain implementations may provide one or more of the following advantages. IT infrastructure consolidation and rationalization may provide an opportunity to achieve technical performance and operating efficiency gains leading particularly to more efficient overall performance with less technical resources and thus to cost-savings. One potential benefit may be to effectively shift to a lower-cost scale curve for server technology and operations, as well as reduce the total number of servers employed.

Accordingly, the present system may, in one implementation, consider three state-of-the-market, or leading practices for server consolidation. First, server management tools and methods may be utilized. Productivity may be improved by leveraging server management tools and industry leading practices. The resultant benefits may include improved server performance and utilization monitoring. In addition, human interventions may also be reduced with automated tools, and staff leverage may be increased by implementing fewer distributed staff.

Second, the servers may be centrally-located. Also, workloads may be migrated from distributed servers to centralized servers. Consequently, servers may be physically located in mission critical-appropriate and highly efficient facilities. In addition, storage may be shared among multiple applications/personnel, and fewer operation staff may be assigned.

In a third practice, workload may be consolidated. Similar workloads may be shifted to larger, shared servers, and workloads may run on dedicated processors or on virtually-partitioned processors. Such consolidation of workload may increase utilization of server technology by implementing fewer servers, reducing demand for capital, and reducing the number of platform support staff required.

Implementations of the present system and techniques described here may include various combinations of the following features.

In one aspect, a system for providing efficient and flexible techniques and tools for modeling technical benefits of consolidating and/or configuration information technology (IT) systems, hardware, software, network, and other infrastructure includes a data processing system designed to receive data from a user. The system also includes an input collection system communicatively coupled to the data processing system, with the input collection system designed to process the data to generate baseline server information. In addition, the system includes an optimization system communicatively coupled to the data processing system, with the optimization system designed to generate one or more server consolidation models based on the baseline server information. Further, the system includes a recommendation generating system communicatively coupled to the data processing system, with the recommendation generating system designed to dynamically generate a recommendation or proposed improved structure based on the generated one or more server consolidation models.

Implementations can optionally include one or more of the following features. Processing the received data can include organizing, converting, and sorting. Also, the received data can include information to describe existing physical and logical server infrastructures including a total number of physical servers and a total number of logical servers. Also, the input collection system can further include a data collecting module designed to organize the received data based on various server identification information. Further, the various server identification information can include at least one of server functionality, a total number of processors present in each server, a type of operating system executing on each server, a number of operating system resident on each server, and processor speed. In addition, the data collection module can further be designed to filter the received data to identify and correct errors.

Implementations can also optionally include one or more of the following features. The input collection system can further include a data conversion module communicatively coupled to the data collection module. The data conversion module is designed to convert the organized data to a format suitable for the optimization system to receive and process.

The data conversion module can be further designed to convert a processor speed as a gross Megahertz value by multiplying the processor speed by a total number or processors resident in each physical server. Also, the data conversion module can be designed to determine a baseline number of current generation processors needed to satisfy an overall gross performance requirement for each server type. Further, the data conversion module can be designed to dynamically update the determined baseline number of current generation processors by adjusting a scaling factor.

In addition, implementations can optionally include one or more of the following features. The input collection system can further include a data sorting module communicatively coupled to the data conversion module. The data sorting module is designed to sort the physical servers based on a server type. In addition, the data sorting module can further be designed to sort the physical servers based on a platform type.

Implementations can further optionally include one or more of the following features. The optimization system can also include a technical model module designed to perform server consolidation based on the baseline server information. The technical model module can also be designed to increase a logical server to physical server ratio to increase a utilization ratio and reduce technology investment costs. Further, the technical model module can be designed to determine a total number of servers that can be consolidated. Likewise, the technical model module can be designated to determine a total number of processors that can be consolidated. In addition, the technical model module can be designated to adjust a processor utilization rate to determine a capacity adjusted number of processors. In addition, the technical model module can be designed to determine a workload adjusted number of processors based on at least one of a fragmentation of workload, a percentage of high available overhead servers for failover, and a margin or error. The technical model module can also be designed to reduce the total number of logical servers through virtualization. Further yet, the technical model module is further configured to reduce the total number of physical servers based on the workload adjusted number of processors and a selected server size. The technical model module is further designed to determine a total number of servers that cannot be consolidated.

Implementations can further optionally include one or more of the following features. The optimization module can also include a financial model module communicatively linked to the technical model module. The financial model module can be designed to generate a total cost savings based on the server consolidation performed by the technical model module. Also, the financial model module can be designed to dynamically recalculate the total cost savings based on one or more key parameters, including an efficiency factor.

The subject matter described in this specification can be implemented as a (particularly at least partly automated) method or as a system or using computer program products, particularly tangibly embodied in information carriers, such as a CD-ROM, a DVD-ROM, a semiconductor memory, and a hard disk or embodied as a signal. Such computer program products may cause a data processing apparatus to conduct one or more operations described in this specification.

In addition, the subject matter described in this specification can be implemented as a system including a processor and a memory coupled to the processor. The memory may encode one or more programs that cause the processor to perform one or more of the method acts described in this specification.

BRIEF DESCRIPTION OF DRAWINGS

FIG. 3 is a table listing of servers sorted by category of server types and platforms. (Example populated with data from a sample environment)

FIG. 4 is table listing baseline number of capacity (CPUs) required to satisfy the processing/computing needs. (Example populated with data from a sample environment)

FIG. 6 is a table of calculations included in the consolidation of a Web server. (Example populated with data from a sample environment)

Like reference symbols in the various drawings indicate like elements. It should be understood that even though embodiments are separately described, single features thereof may be combined to further embodiments.

DETAILED DESCRIPTION

Figure 1:
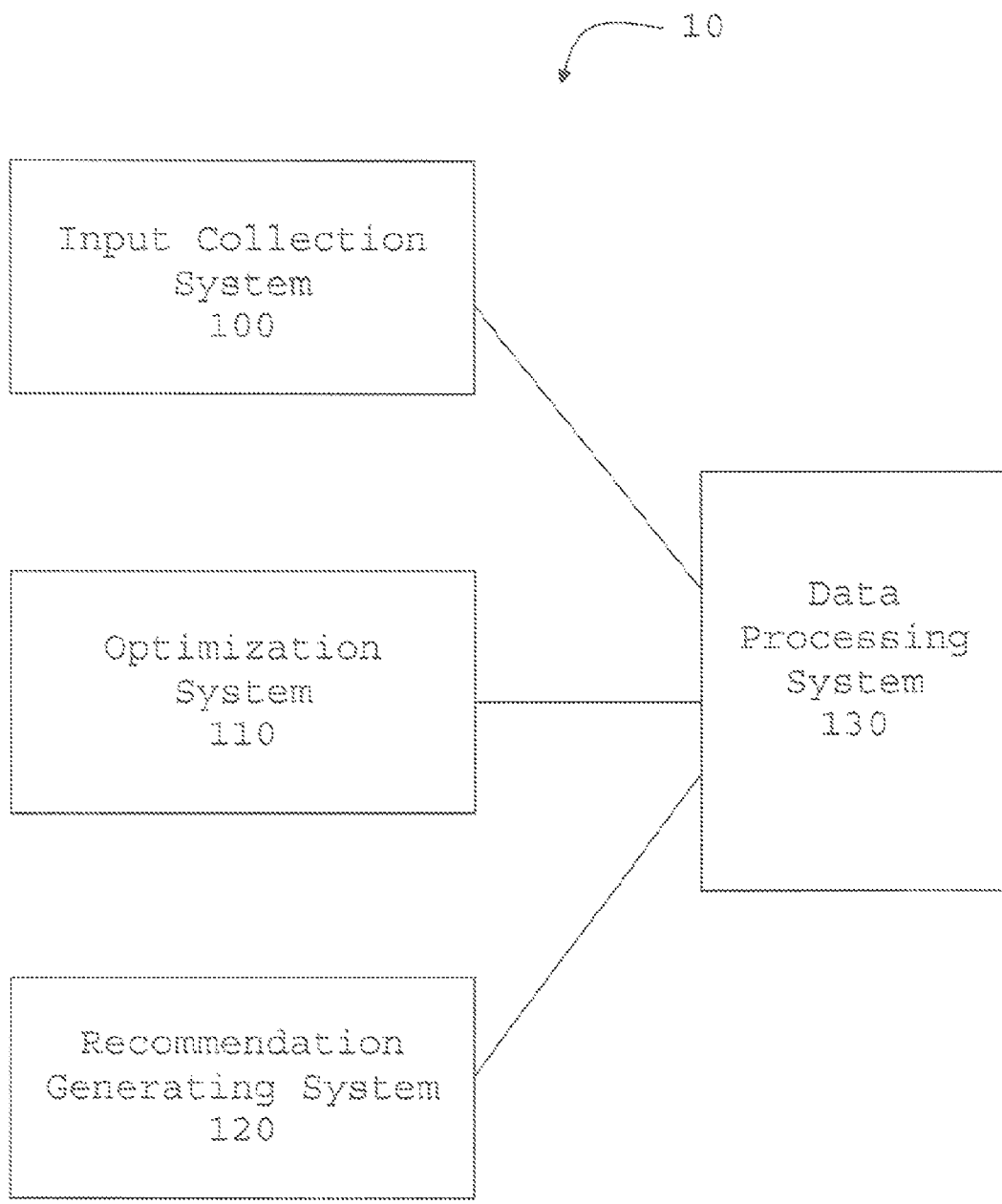
FIG. 1 is a block diagram representing a high level view of a server consolidation and rationalization modeling system.

FIG. 1 illustrates a high-level system configured to implement a dynamic IT infrastructure consolidation and rationalization modeling system 10. A data processing system 130 is implemented as a central command portal for receiving data input from a user and transferring communicated data input/output among three main data processing systems. The received data can include information about existing physical and logical server landscape. For example, the received data can include information (e.g. in the form of tables) describing the logical and physical servers including a total number of logical servers and a total number of physical servers. The data can also include server identification information including a number and/or type of processors (e.g., CPUs) resident on each server, a server type (e.g., the functionality of the server such as web server), a type of operating system (e.g., platform type), and a total number of operating systems resident on each server. Further, other information for describing or identifying each server can be included in the data received from the user.

The data processing system 130 transfers the received data to an input collection system 100 to facilitate analysis of the existing physical and logical server landscape and generate baseline server information representing the current state of the IT infrastructure. The data processing system 130 transfers the generated baseline server information to an optimization system 110, whereby the existing servers, both physical and logical, are consolidated based on computing environment specific data, generally-accepted industry standards, and/or Applicant-generated variables. The optimization system 110 may also be configured to perform sensitivity analysis incorporating well documented assumptions into the consolidation and rationalization modeling system 10. A third component is a dynamic recommendation generating system 120 implemented to output a recommendation or proposed improved structure based on a generated consolidation model tailored to computing needs of a specific computing environment.

Figure 2:
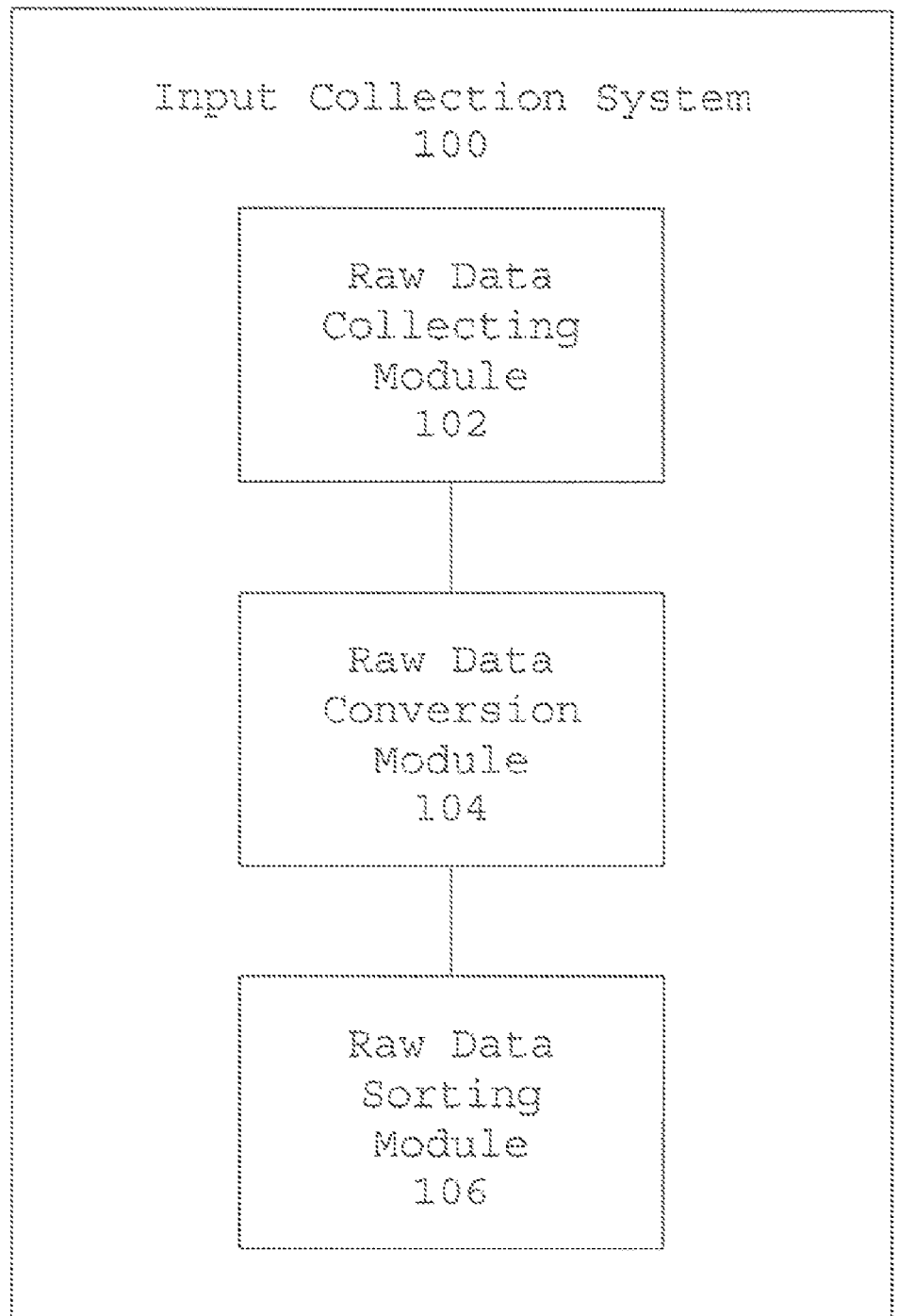
FIG. 2 is a detailed diagram of the input collection system.

FIG. 2 represents a detailed view of the input collection system 100. A data collection module 102 receives and organizes the data input compiled to describe physical and/or logical server infrastructures of a computing environment, which may include a variety of server identification information. Each physical server may be identified based on server functionality, number and/or type of processors; a type and number of operating system running on the server; and processor speed. There may be additional detailed information obtained for each server. The data is filtered to identify and correct erroneous data input such as entering units for the processor speed in an inaccurate order of magnitude.

A data conversion module 104 of the input collection system 100 processes the organized data and converts them to a format suitable for the optimization system 110 to receive and process. The conversion of the data includes the following: The processor speed for each physical server is converted as a gross Megahertz value by multiplying the processor speed by the number of CPUs included in the server. See Equation (1). The calculated gross Megahertz value for each physical server is normalized to take into account differences among servers from different vendors or manufacturers by multiplying the gross Megahertz value by a corresponding performance factor obtained from Transaction Performance Council, referred to as TPM (transactions per Minute) to generate a gross performance value for each physical server. See Equation (2). The gross performance value is an Applicant-generated variable for normalizing the processor implementation across different servers based on different server vendors, operating systems, and general configurations of CPUs utilized. The gross performance value for each physical server may be added together to obtain an overall baseline computing or processing needs of the computing environment. See Equation (3).

$$GM = PS \times NC \quad (1)$$

$$GP = PF \times GM \quad (2)$$

$$TP = \Sigma(GPS) \quad (3)$$

GM=gross Megahertz
PS=processing speed
NC=number of CPUs
GPS=gross performance per server
PF=processor factor
TP=total processing needs The server identification information included in the data may additionally be used by a data sorting module 106 to sort the physical servers into various categories of server types based on specific functions performed by each server. The implementation supports server optimization for a variety of different server functions. Typically, the variety of servers may include a dozen or more. Twelve common ones may include: A) A Web server provides HTTP/HTTPS services (ports 80/443) to a Web browser client. B) A Web services server provides XML/SOAP services. C) A client/server thin server provides data or application services to a thin, proprietary client (client portion only displays the results of data processing on the server). D) A client/server thick server provides data or application services to a thick, proprietary client (client provides part or much of the data processing). E) A database server is a database management system providing a data resource to users or other servers. F) A FTP server provides files and/or data via the FTP service. G) A network management server provides network user accounts management or other services essential for maintaining the network. H) A remote access server provides application services to thin clients or networked computers. I) An applications server provides application services not otherwise covered by other servers. J) A file server is responsible for the central storage and management of data files so that other computers on the same network can access the files. A file server allows users to share information over a network without having to physically transfer the files. K) An e-mail server organizes, sorts, and/or routes e-mail messages over a communications network. L) A print server manages printing commands and/or cues.

FIG. 3 illustrates an example distribution of servers among different categories of server types achievable with the data sorting module 106. The number of servers shown in each category of server types represent a baseline server count currently existing for the computing environment in each category of server types. In an alternate implementation, the baseline server counts may be dynamically adjusted by varying a baseline adjustment factor to a value greater than 0%. This allows for an instantaneous up-scaling of the overall IT infrastructure by simply changing the baseline adjustment factor without having to adjust each category of server types individually. The flexibility of this design also allows the IT system to be configured or modeled effortlessly as the needs of the computing environment changes.

Servers within each category of server types may be further sorted based on different platforms including Windows, Linux, Unix, and other platforms. Within each platform type for each category of server types, servers may be categorized as small, medium, large, or enterprise. For the purposes of this representation a small server includes 1-2 CPUs; a medium server includes 3-8 CPUs; a large server includes 9-16 CPUs; and an enterprise server includes 17-32 CPUs. Accordingly, for the purposes of this representation, a small server has a storage capacity range from about 50 gigabyte (GB) to less than about 500 GB; a medium server has a storage capacity range from about 500 GB to less than about 1 Terabyte (TB); a large server has a storage capacity range from about 1 TB to less than about 5 TB; and an enterprise server has a storage capacity range of at least about 5 TB. These specific categories and attributes/ranges may differ for individual companies and technological configurations. Advances in the technology marketplace will necessarily change these categories and ranges.

The data conversion module 104 may also be implemented to calculate a total number of current generation CPUs needed to satisfy an overall gross performance requirement for each category of server types. The gross performance value for each physical server is combined together for all servers within each category of server types to determine the overall gross performance for each category of server type. The overall gross performance for each category of server type is divided by a gross performance value of a current generation CPU to determine a baseline number of current generation CPUs needed to satisfy the computing or processing requirement for each category of server type. See Equation (4). In an alternative implementation, the baseline number of current generation CPUs calculated may be dynamically updated by adjusting a scaling factor. See Equation (5). The scaling factor represents the % utilization of the CPUs implemented. By adjusting the scaling factor to a value greater than 100%, it establishes a baseline for the current inventory of servers and facilitates extrapolation for server data not gathered from the computing environment. Thus, dynamic scaling capability creates flexibility in the overall IT infrastructure consolidation and/or configuration system and provides the computing environment with a desired degree of design freedom to change the baseline number of CPUs to be implemented quickly and easily. FIG. 4 illustrates a typical list of baseline number of CPUs to be implemented for each category of server types, pre-optimization.

$$BC = (\Sigma GPS)/GPC \tag{4}$$

$$RBC = ((\Sigma GPS)/GPC) \times SF \tag{5}$$

BC=baseline number of current generation CPUs per server category
GPS=gross performance per server within a server category
GPC=gross performance per current generation CPU
RBC=revised total current generation CPUs per server category
SF=scaling factor The gross performance value of the current generation CPU may vary depending on the server platform utilized and the current state of technology. For example, in one implementation, a 3 GHz speed Intel-manufactured CPU may have a gross performance value=32,640 per CPU, and a 1.9 GHz IBM-manufactured CPU may have a gross performance value=27,284 per CPU. Servers incorporating the Intel CPU may be used as Linux and Windows platform servers, and servers incorporating the IBM CPU may be used as Unix and Other platform servers.

Figure 5:
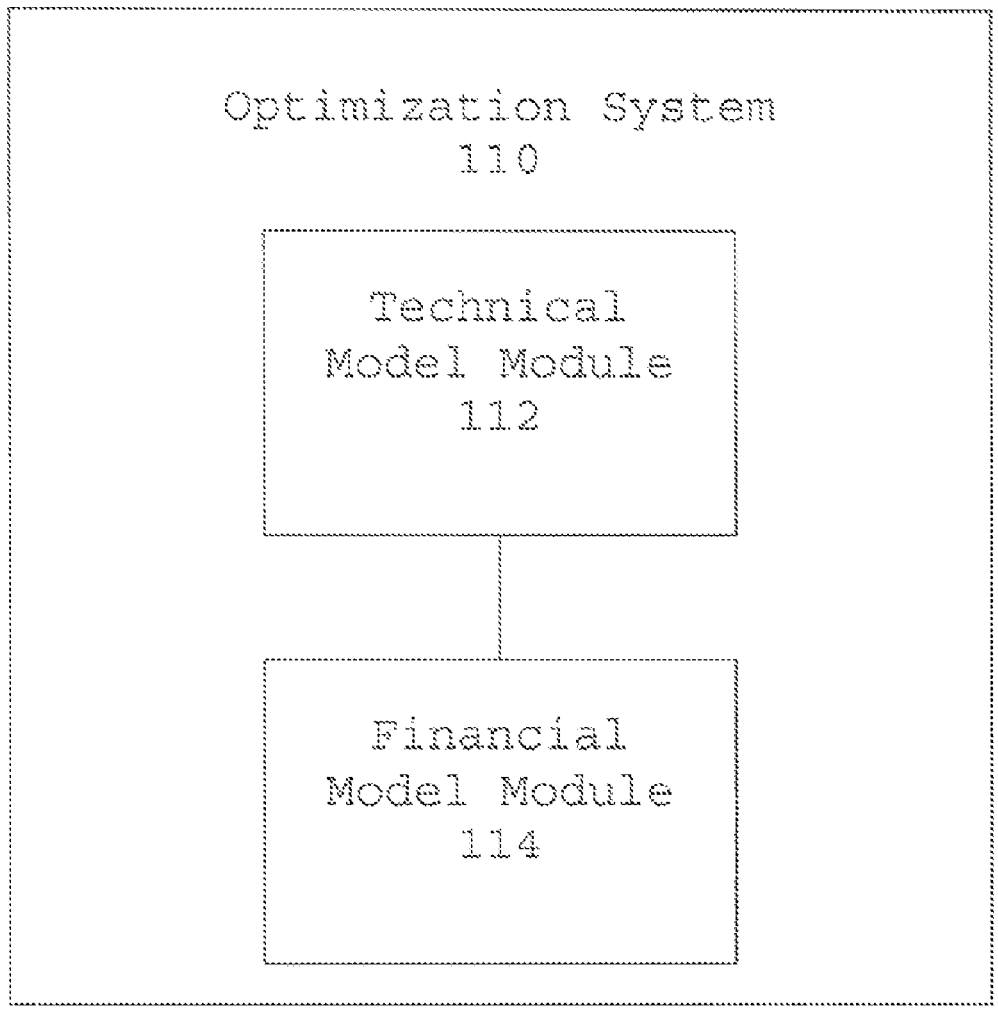
FIG. 5 is a detailed block diagram of the optimization system including a technical model module and a financial model module.

FIG. 5 is a detailed view of the optimization system 110 configured to generate a Web server model. In generating the Web server model or any other category of server type described above, three types of input (constants and/or variables) are implemented. The computing environment- (client-) provided data pertaining to the current state of IT infrastructure, whereby quantitative IT infrastructure information such as the baseline number of CPUs and servers needed can be determined using the input collection system 100. In addition, two categories of variables are incorporated into the Web server model design. The first category includes a set of industry standards, and the second category includes a set of Applicant-generated variables. These Applicant-generated variables are unique set of values obtained exclusively by the Applicant through many years of industry experience. Accordingly, the second category of variables are especially critical in generating a successful and efficient consolidation model.

The optimization system 110 is implemented to include a technical model module 112 and a financial model module 114. The technical model module 112 is configured to calculate an Ability to be Consolidated, a Normalized Current Capacity, a Utilization Ratio, a Workload Adjustment, and/or Physical and Logical Servers Setup. These variables are explained more in detail below.

FIG. 6 illustrates an example technical model module 112 calculations for the Web server model including the three types of input described above. The technical model module 112 is configured to analyze the baseline number of servers determined in the input collection system 100 above to further determine an overall ability of the servers to be consolidated. Increasing the logical server to physical server ratio increases the utilization of the server system and thereby reduces the overall technology investment costs.

The baseline server counts as determined by the data sorting module 106 above is multiplied by a corresponding percent consolidated variable, an Applicant-generated variable representing a percentage of the physical servers that can be consolidated. The product of the two operands represents the total number of servers that can be consolidated with the remaining number of servers representing those that cannot be consolidated. This higher degree of consolidation may be determined in order to increase overall efficiency and/or corresponding cost savings of the IT infrastructure consolidation and/or configuration system.

The same percent consolidated variable is applied to the baseline number of current generation CPUs required to satisfy the overall gross performance requirement for the Web server category. The total number of CPUs to be consolidated also represents a raw required capacity excluding the unconsolidated severs since the number of CPUs multiplied by the gross performance of the current generation CPU results in the total computing or processing capacity for the Web server category. This is also true for the other categories of server types.

An important factor to consider when performing IT infrastructure consolidation and rationalization includes CPU utilization. Often, the existent CPU utilization is low, and only a small percentage of each CPU is being utilized. Based on industry standards, server configurations my be designed to achieve peak average CPU utilizations of 60% or more. In order to compensate for the discrepancy in the CPU utilization, the current utilization rate is divided by the industry-recognized peak average CPU utilization rate, and the quotient is multiplied by the total number of CPUs to be consolidated (which represents the raw required capacity excluding the unconsolidated servers) to determine the capacity adjusted number of CPUs required. See Equation (6). For the example shown in FIG. 6, after the capacity adjustment, the total number of CPUs required is reduced from 66 to 16.

$$U = (CUR/PA) \times NCC \tag{6}$$

U=utilization of CPUs desired
CUR=current utilization rate
PA=peak average CPU utilization
NCC=normalized current capacity Still, another factor to address when performing consolidation of servers includes workload adjustments. There are several parameters that fall under the umbrella of workload adjustments including fragmentation of workload, percentage of high available overhead servers for failover, and margin of error. Although similar application may be moved to a centralized server location, it is difficult to perform under 100% efficient workload consolidation. Consequently, nearly 15% fragmentation of workload may be expected, based on industry standards. Adjusting for such fragmentation of workload increases the total number of CPUs to be implemented in order to create a failover buffer as overhead capacity. The capacity adjusted for workload fragmentation may be calculated as being equal to the number of CPUs adjusted for utilization divided by the quantity (1−fragmentation rate). See Equation (7). Implementing this overhead capacity will prevent foreseeable fragmentation in workload from diminishing the efficiency of the server system.

$$ACF = U/(1-FR) \tag{7}$$

ACF=adjusted capacity for fragmentation
U=utilization of CPUs desired
FR=fragmentation rate Overhead calculations are essential under the workload adjustments in order to prevent a drop in efficiency or performance due to CPU failures. Based on Applicant-generated variables, it is determined that 25% overhead capacity may be added to the capacity calculation to compensate for possible CPU failures. Assuming a 25% overhead capacity calculation, the total number of CPUs (capacity) with failover compensation increases from 19 to 24. In addition, an industry-accepted standard on margin of error of 20% (for example) for Linux servers, which further increases the overall capacity calculation to 29 CPUs required. Even with the added excess capacity to prevent loss of performance, the total number of CPU (capacity) required has been reduced from 66 to 29 CPUs.

One other factor that may affect consolidation of server system is the designed ratio of physical and logical servers. Increasing logical servers is achieved through the use of virtualization software operating on the hardware servers. Through a virtualization technique, multiple operating systems can be implemented on each physical server by partitioning the physical server into multiple virtual servers. The benefit is that a single physical server can replace multiple physical servers through virtualization. Based on another Applicant-generated and unique variable, the number of logical servers may be reduced by 60% (for example) through virtualization. Such logical server consolidation reduces the number of logical servers from 51 to 20 in the exhibited example.

Based on the number of consolidated capacity (for example, 29 CPUs after the overhead capacity implementation above) and the category of server type being implemented, the appropriate physical server size is selected from the list of small, medium, large, and enterprise using yet another Applicant generated variable, CPUs per physical server. Again this is a variable uniquely generated by the Applicant through multiple years of experience in the industry. Dividing the capacity required by the physical server size (number of CPUs per physical server) results in the total number of physical servers required.

In addition to the servers that can be consolidated, those servers that cannot be consolidated still must be processed. The size of the physical servers for these unconsolidated servers is determined through similar process as above in determining the total number of physical servers required for the consolidated servers. Another Applicant generated variable is used to determine the appropriate size of the physical servers of unconsolidated type.

Fourteen other categories of server types are analyzed (modeled and consolidated) based on similar data processing techniques as described above for the web server.

The output from the technical model module 112 is automatically inputted into the financial model module 114 and the total cost savings based on the server consolidation performed by the technical model module 112 is generated automatically. The cost analysis generated includes the following: average server costs; average personnel costs; baseline hardware and software costs; post optimization hardware and software cost; post optimization personnel costs; server cost benefit analysis; dynamic graphical cost analyzer; and optimization costs. The financial model module 214 includes multiple pricing information embedded into the model. The pricing information is categorized based on types and sizes of the servers as previously defined and sorted by the technical model module 112. Using this pricing information, the current state server costs can be extrapolated to provide an accurate measure.

From the data describing the current state physical and logical servers (hardware and software), baseline hardware and software purchasing and operating costs are calculated. This represents the current state server costs. In addition to the server costs, the average personnel costs in terms of system admin, IT support staff, IT operations managers, and functional overhead are automatically calculated. Further, a personnel-to-server ratio is determined to represent a baseline ratio, which is likewise applicable to the post-optimization system. However, the baseline ratio of personnel to server can be adjusted to represent potential increases or decreases in achievable personnel efficiency.

The financial model module 114 incorporates several dynamic features that render the financial model module 114 flexible and accessible to quick recalculations based on changes in some key parameters. In one implementation, an efficiency factor can be adjusted to scale up or down the desired efficiency of the consolidation system. This allows the computing environment to design specific overhead or backup capacity to prevent performance degradation due to server failures or unexpected high processing demand. In addition, the financial model module 114 can also be implemented to provide interactive scenario graphs, whereby an adjustment in the efficiency factor immediately recalculates all data processing fields dynamically. Thus, multiple scenarios can be considered and compared before deciding on one.

Figure 7A:
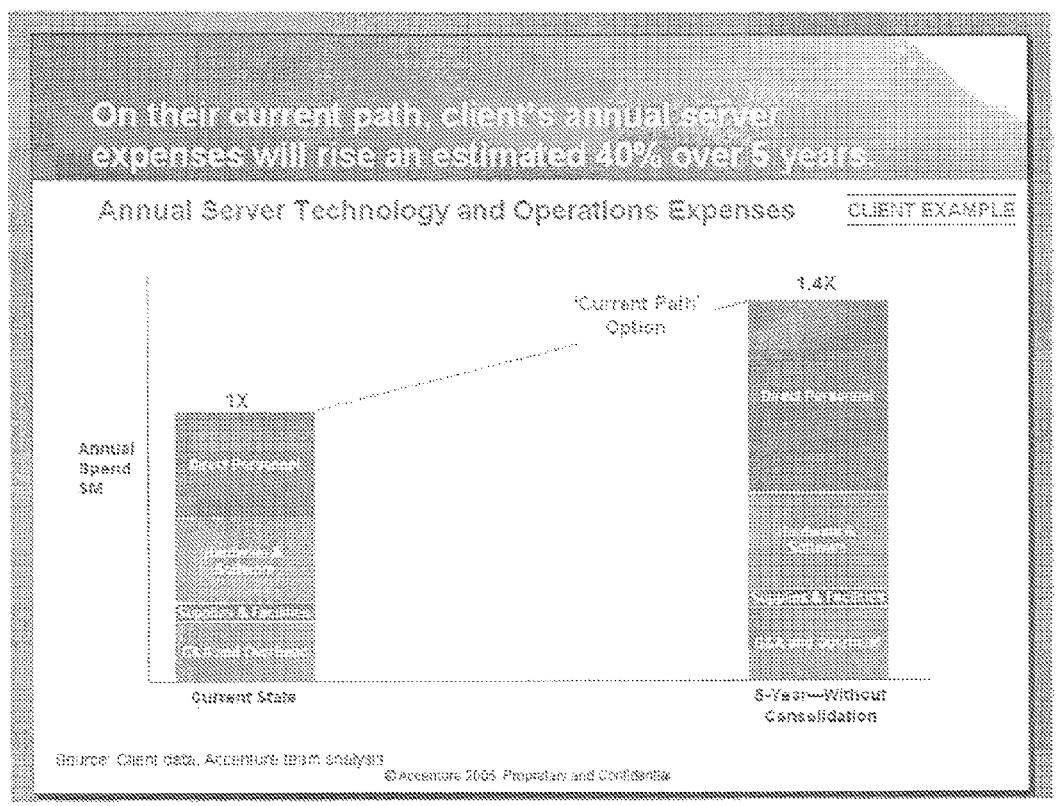
FIGS. 7a-d illustrate example output generated by the recommendation generating system.
Figure 7B:
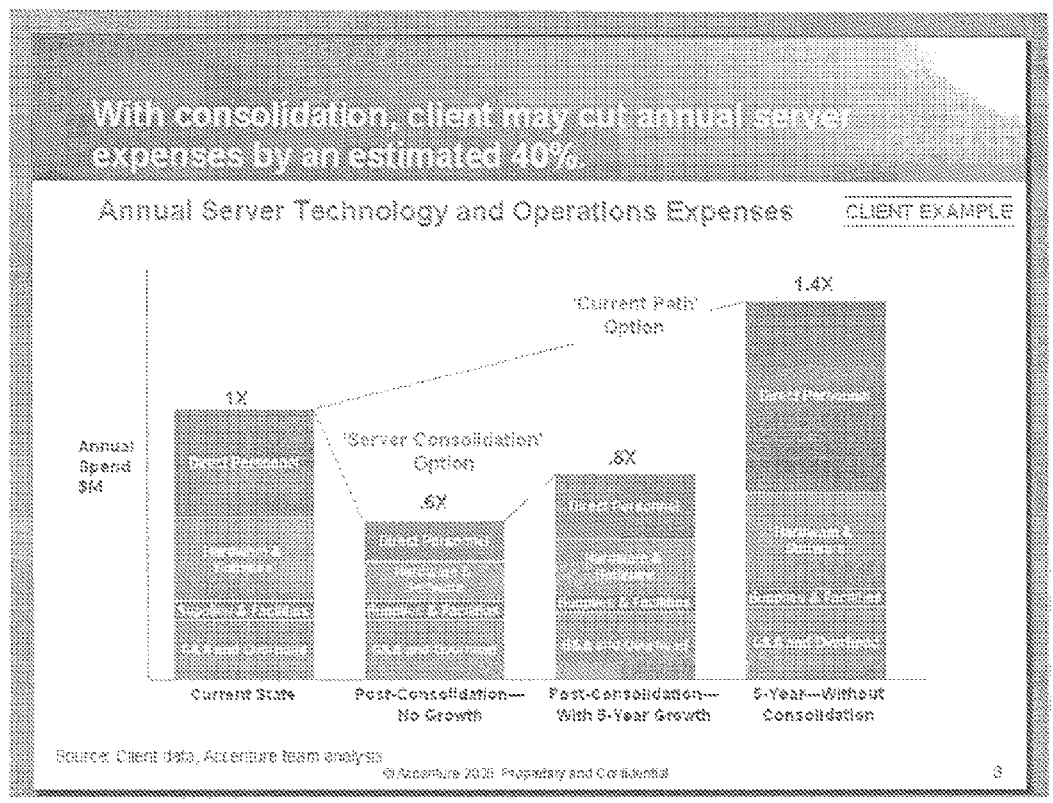
Figure 7C:
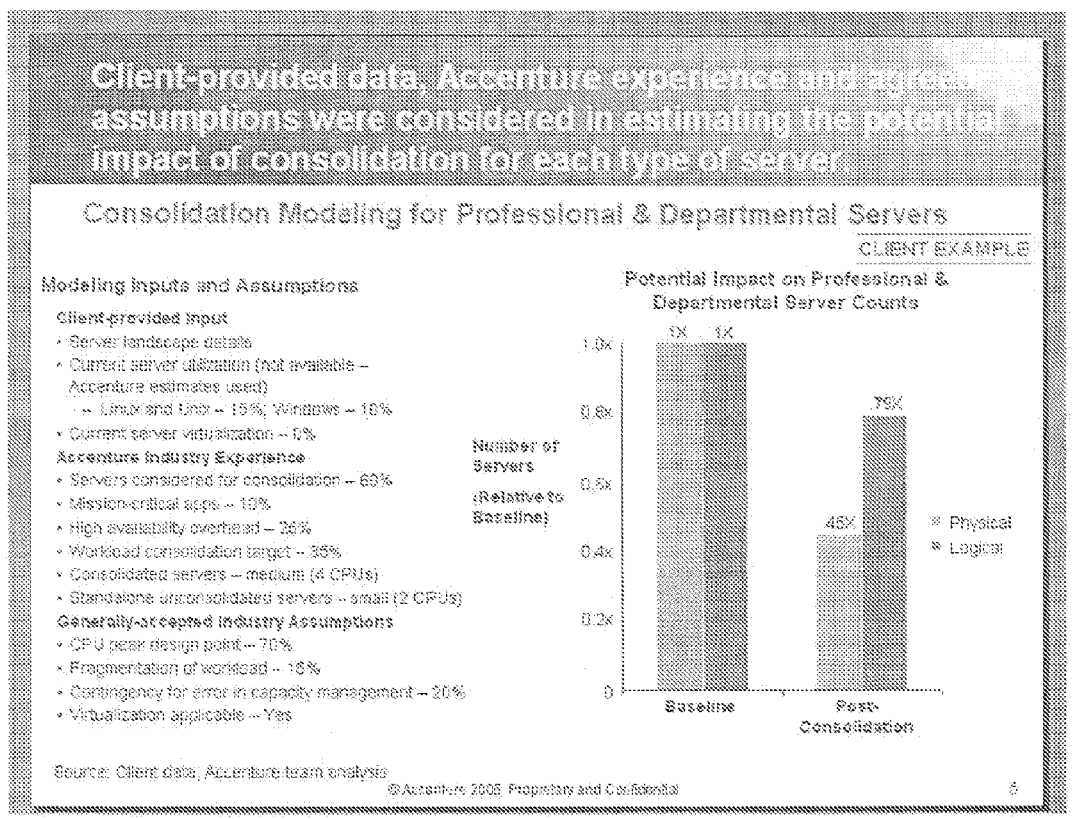
Figure 7D:
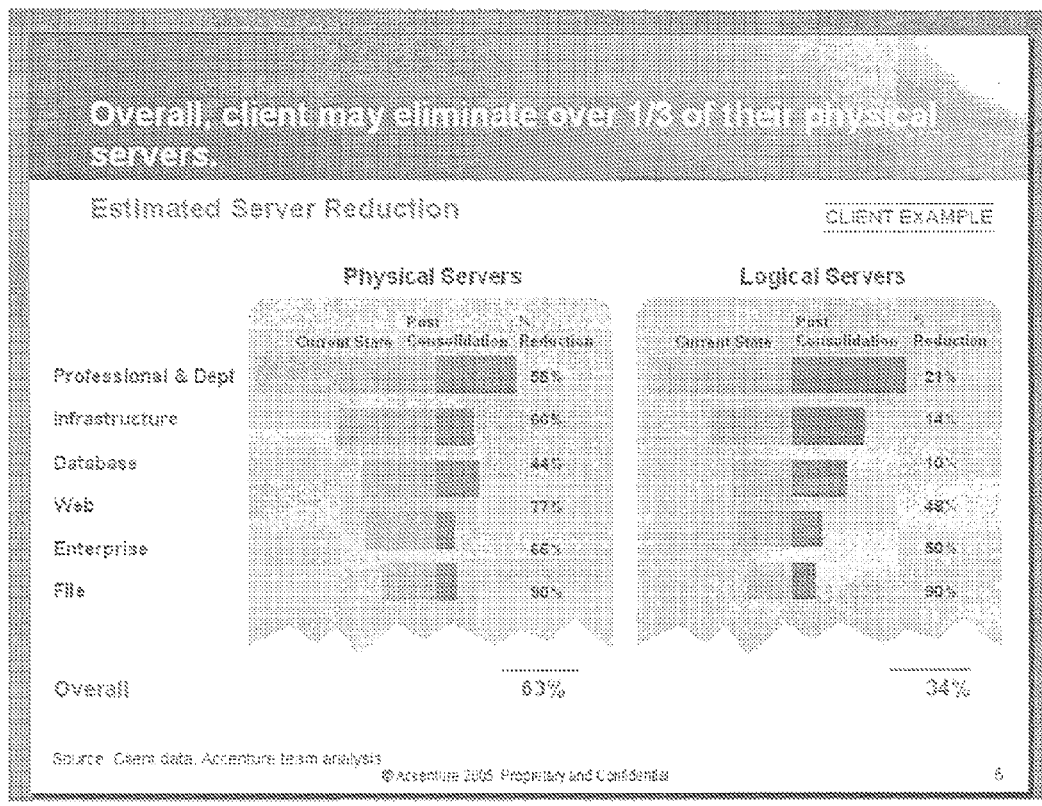

Output from both the technical model 112 and the financial model module 114 are displayed as a table and/or chart and the recommendation system 120 can further be configured to provide comparison tables, charts, and graphs. FIGS. 7a-d illustrates representative recommendations or configurations that may be generated by the recommendation 120. Specifically, FIG. 7a illustrates the current growth projection for server-related IT expenses based on the data provided by the client; FIG. 7b describes the cost saving gains possible with the recommended consolidation an rationalization model; FIG. 7c represents the impact of consolidation for each type of server; and FIG. 7d illustrates the overall reduction in the number of physical and logical servers implemented with the recommended consolidation and rationalization model. These graphical illustrations facilitate understanding of the recommended consolidation model by clearly representing how each targeted area has been improved. The recommendation system 120 can also be configured to interface with a display, a printer, or any other related output devices to facilitate a visual display of the recommendation. The recommendation system 120 can further be configured with a user interface to facilitate interactive reviewing and analysis of the recommendation.

Figure 8A:
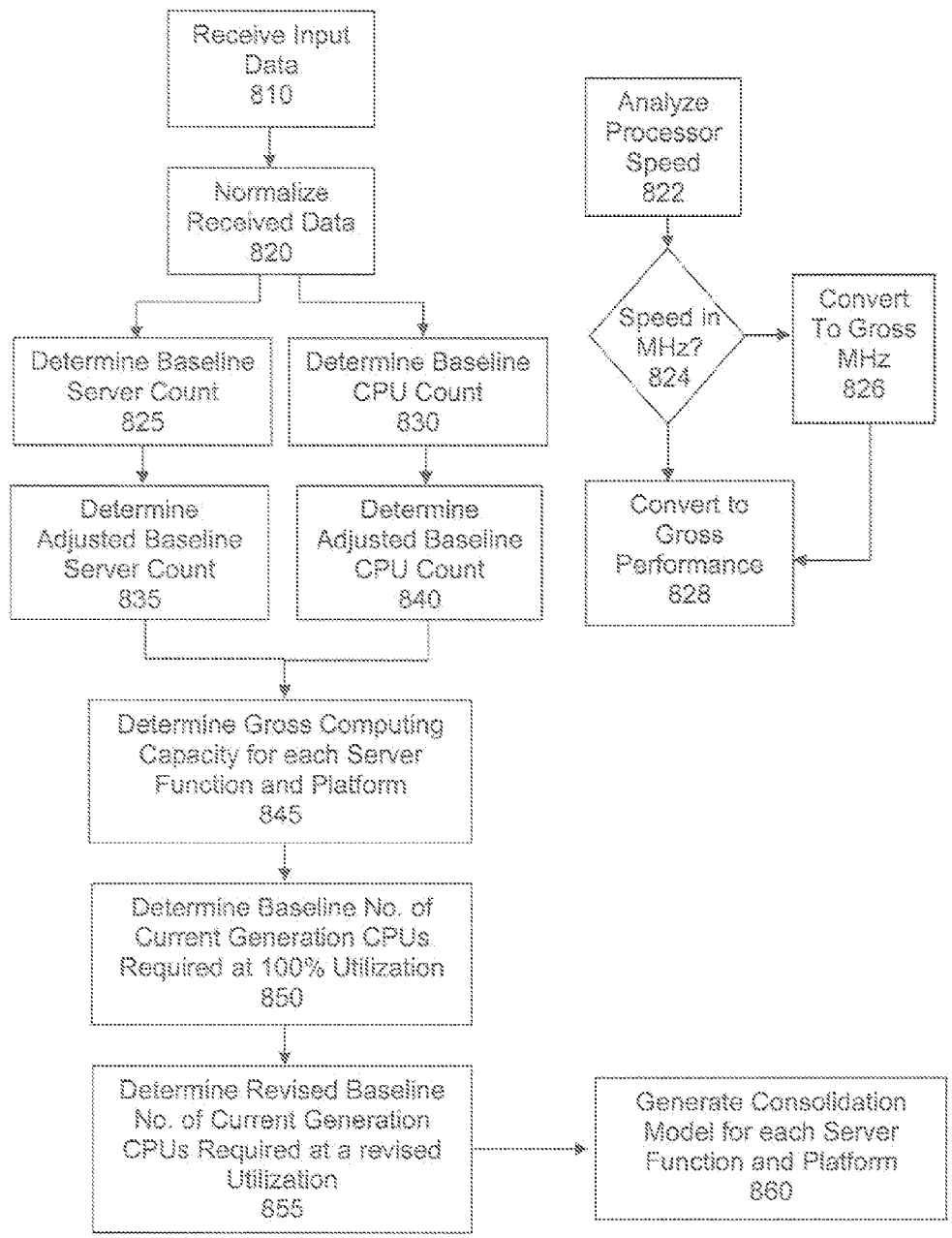
FIGS. 8a-b depict a process for implementing a server consolidation tool.
Figure 8B:
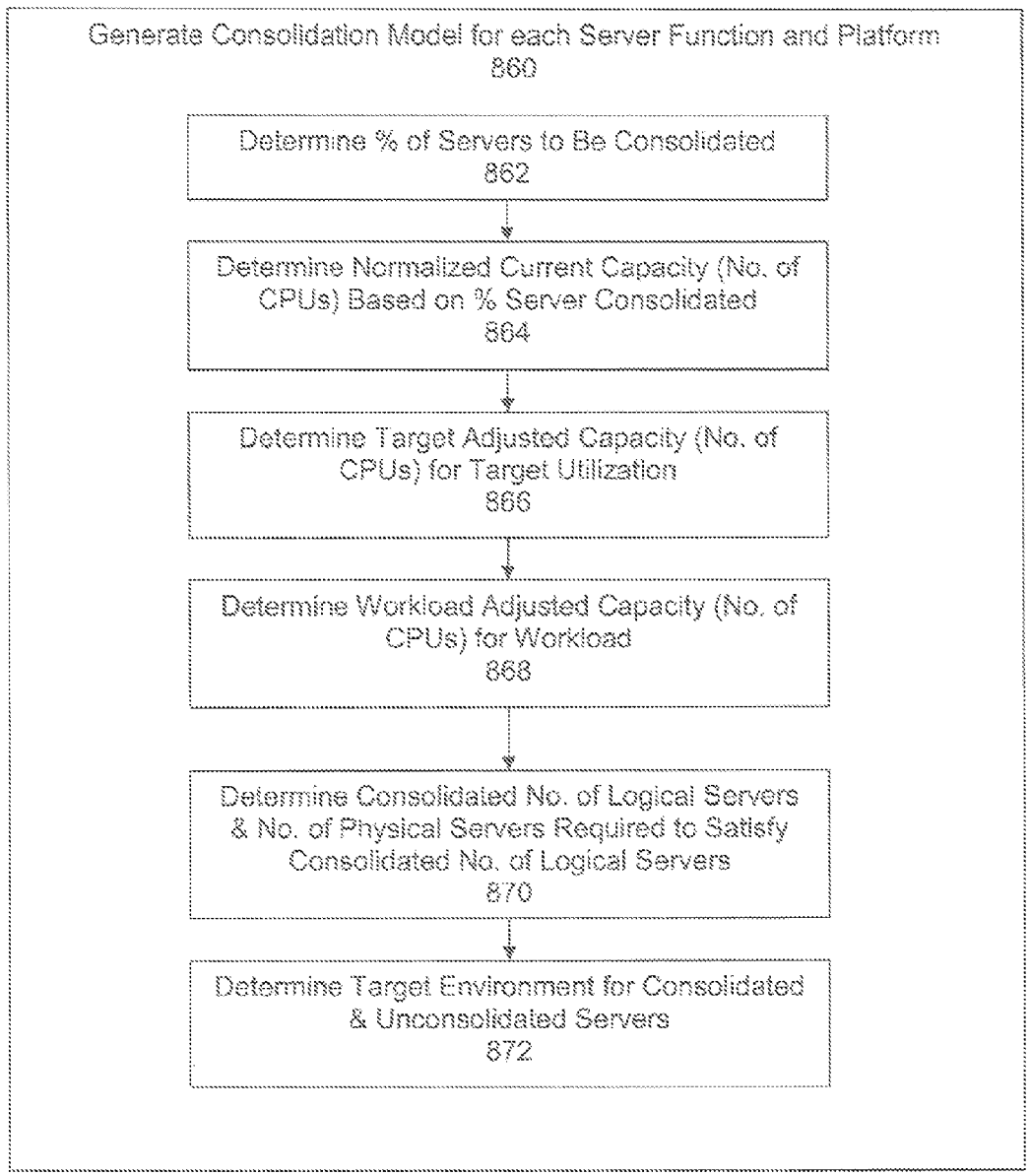

FIGS. 8a-b illustrate a process 800 for implementing the server consolidation tool as disclosed in the present specification with respect to FIGS. 1-7d. Input data is received from a user at 810. The received input data, in this example, includes various information for identifying each server in the computing environment. Following are some possible server identification information: 1) Record ID, 2) Business Unit Code, 3) Server ID, 4) Network ID, 5) Site ID, 6) Server Function Code 7) Vendor Name, 8) Model Number, 9) Serial Number, 10) Processor Type, 11) Processor Count, 12) OS Type, 13) Processor Speed, 14) Platform, and 15) Category.

The received input data is converted at 820, where necessary, to normalize the data. For example, different server vendors may list the processor speed using different unit of speed, such as Gigahertz (GHz), Megahertz (MHz), etc. Thus, the process speed for each server is analyzed at 822, and a decision is made at 824 to verify the processor speed for each server. If necessary, the verified processor speed is converted to a standardized gross processor speed at 826 using Equation (1). In one implementation, the processor speed for each server is converted to MHz. Also, servers manufactured by different server vendors (e.g., Dell®, IBM®, Compaq®, HP®, etc.) with a stated processor speed may in fact have slightly varied processor speeds. Table 1 illustrates examples of different vendor factors. The actual processor speed may depend on various factors including hardware and software configurations and design choices. To compensate for this variation in the actual processor speed, the converted gross MHz processor speed is normalized at 828 using a vendor specific processor factor to generate a gross performance value using Equations (2). Sum of all gross performance values corresponding to the servers in each server category (e.g., server functionality and platform) is calculated to determine the total processing needs using Equation (3).

TABLE 1

List of Vendor Factors

| Non-Windows Vendor | Factor | Windows Vendor | Factor |
|---|---|---|---|
| Compaq | 11.98 | Compaq | 10.88 |
| DEC | 11.98 | DEC | 11.98 |
| Dell | 10.88 | Dell | 10.88 |
| Gateway | 10.88 | Gateway | 10.88 |
| Generic | 10.88 | Generic | 10.88 |
| HP | 15.79 | HP | 10.88 |
| IBM | 14.36 | IBM | 10.88 |
| Intel | 10.88 | Intel | 10.88 |
| Intergraph | 12.29 | Intergraph | 10.88 |
| Micron | 10.88 | Legend | 10.88 |
| NetApp | 10.88 | Micron | 10.88 |
| Other | 10.88 | NetApp | 10.88 |
| Qsystem | 10.88 | Other | 10.88 |
| SGI | 14.49 | Qsystem | 10.88 |
| Sun | 14.49 | SGI | 14.49 |
| SuperMicro | 10.88 | Sun | 14.49 |
| SYSOREX | 10.88 | SuperMicro | 10.88 |
| Unknown | 10.88 | SYSOREX | 10.88 |
|  |  | Unknown | 10.88 |
|  |  | Vulcan | 10.88 |

The normalized data generated at 820 is used to generate the baseline server and processor (e.g., CPU) count information for each category in the computing environment at 825 and 830 respectively. In generating the baseline server and processor information, the servers described and listed in the normalized data are sorted and organized into two groups, server count and CPU count. The server count information is generated by processing the normalized data to sort the servers based on the server functionality. Table 2 includes a list of server functionalities along with the corresponding server functionality codes.

TABLE 2

List of Server Functionalities

| Server Function Code | Server Functionality |
|---|---|
| A | Applications Server |
| B | Video Servers |
| C | Client/Server Thin |
| D | Database Server |
| E | Email Servers |
| F | FTP |
| I | File Servers |
| N | Network Management |
| O | Other |
| P | Print Servers |
| R | Remote Access |
| S | Web Services |
| T | Client/Server Thick |
| V | Voice Servers |
| W | Web Server |

For each server functionality, the servers are further sorted based on the platform. For example, all application servers (code A) are sorted as Linux servers, Other servers, Unix servers, and Windows servers. The process repeats for other server functionalities (e.g., B, C, D, D, F, I, N, O, P, S, T, V, and W). Table 3 (similar to FIG. 3) illustrates an example of a server count information generated. For example, Table 3 shows that after sorting the servers, the computing environment contains 2615 category A servers, of which 97 servers are Linux platform servers, 176 servers are other platform servers, 513 servers are Unix platform servers, and 1829 servers are Windows platform servers.

TABLE 3

List of Server Count

| Sum of Server Count Server Functionality Code | Platform | | | | |
|---|---|---|---|---|---|
|  | Linux | Other | Unix | Windows | Grand Total |
| A | 97 | 176 | 513 | 1829 | 2615 |
| B |  |  |  | 11 | 11 |
| C | 2 | 10 | 23 | 271 | 306 |
| D | 41 | 18 | 342 | 649 | 1050 |
| E | 8 | 29 | 8 | 373 | 418 |
| F | 3 | 3 | 18 | 17 | 41 |
| I | 30 | 59 | 65 | 660 | 814 |
| N | 30 | 45 | 105 | 641 | 821 |
| O | 72 | 122 | 237 | 1057 | 1488 |
| P |  | 5 | 2 | 88 | 95 |
| R | 3 | 3 | 24 | 79 | 109 |
| S | 10 | 5 | 22 | 82 | 119 |
| T |  | 1 | 14 | 64 | 79 |
| V |  |  |  | 9 | 9 |
| W | 64 | 18 | 95 | 881 | 1058 |
| Grand Total | 360 | 500 | 1469 | 6714 | 9043 |

The CPU count information is likewise organized based on the server functionalities (represented by codes, A, B, C, D, D, F, I, N, O, P, S, T, V, and W). Instead of counting all servers, as is the case with server count, the number of CPUs are totaled for each server functionality (where some servers contain more than one CPUs). The number of CPUs are further sorted based on the platform. Table 4 illustrates an example of CPU count information generated. For example, after appropriate sorting, the computing environment contains 5663 CPUs corresponding to the 2615 servers of category type A. The 5663 CPUs are further sorted to show that 191 CPUs are from Linux servers, 250 CPUs are from other servers, 1578 CPUs are from Unix servers, and 3644 CPUs are from Windows servers.

TABLE 4

CPU Count

| Sum of Processor Count Server Functionality Code | Platform | | | | |
|---|---|---|---|---|---|
|  | Linux | Other | Unix | Windows | Grand Total |
| A | 191 | 250 | 1578 | 3644 | 5663 |
| B |  |  |  | 17 | 17 |
| C | 2 | 19 | 97 | 573 | 691 |
| D | 79 | 34 | 1371 | 1508 | 2992 |
| E | 14 | 61 | 13 | 785 | 873 |
| F | 5 | 3 | 25 | 25 | 58 |
| I | 54 | 91 | 89 | 1245 | 1479 |
| N | 45 | 63 | 182 | 1062 | 1352 |
| O | 119 | 185 | 414 | 1912 | 2630 |
| P |  | 7 | 2 | 188 | 197 |
| R | 3 | 5 | 51 | 145 | 204 |

TABLE 4-continued

CPU Count

| Sum of Processor Count Server Functionality Code | Platform | | | | Grand Total |
|---|---|---|---|---|---|
| | Linux | Other | Unix | Windows | |
| S | 13 | 10 | 60 | 138 | 221 |
| T | | 1 | 31 | 127 | 159 |
| V | | | | 13 | 13 |
| W | 126 | 33 | 226 | 1724 | 2109 |
| Grand Total | 651 | 774 | 4140 | 13110 | 18675 |

Once the server count and CPU count as shown in Tables 3-4 are generated at 825 and 830 respectively, a baseline adjustment factor for the server count and a baseline adjustment factor for the CPU count are accessed to generate an adjusted server count and an adjusted CPU count at 835 and 840 respectively. Adjusted server count and adjusted CPU count can be generated as shown in Equations (8)-(9).

$$ASC = SC \times (1+SCAF) \quad (8)$$

$$ACC = CC \times (1+CCAF) \quad (9)$$

ASC=Adjusted Server Count
SC=Server count
SCAF=Server Count Adjustment Factor
ACC=Adjusted CPU Count
CC=CPU Count
CCAF=CPU Count Adjustment Factor The adjusted server count and adjusted CPU count allows flexibility in determining a consolidation model consistent with the present specification. The adjusted server count and adjusted CPU count are used to generate a gross computing capacity, at 845, for each server category (as sorted in Table 3 based on server functionality and platform) based on the total number of CPUs in each server category using Equations (10).

$$GCC = (\Sigma GP) \quad (10)$$

$$BC = (\Sigma GP)/GPC \quad (4)$$

$$RBC = ((\Sigma GP)/GPC) \times SF \quad (5)$$

GCC=gross computing capacity
BC=baseline number of current generation CPUs per server category
GP=gross performance per server within a server category
GPC=gross performance per current generation CPU
RBC=revised total current generation CPUs per server category
SF=scaling factor The gross computing capacity is a sum of all gross performances for all CPUs in each existing server category as shown in Equation (10). Since the CPUs are of different generation, speed, type, etc., the Gross computing capacity is divided by the gross performance of a current generation CPU to determine the equivalent number of current generation CPUs needed to provide the existing gross computing capacity. In other words, the gross computing capacity is used to generate a baseline number of current generation CPUs per server category at 850 using Equation (4). This standardizes the gross computing capacity in terms of current state of technology (e.g., computing capacity of current generation CPUs). A revised total current generation CPUs per server category is also generated using Equation (5) at 855 (See FIG. 4). By using a scaling factor, the baseline number of current generation CPUs are revised to allow variations in the gross computing capacity desired. For example, if the number of servers and/or CPUs in the existing computing environment changes for any reason, the scaling factor can be used to revise the baseline number of current generation CPUs needed to perform the gross computing capacity dynamically.

The revised baseline current generation CPUs determined at 855 is used to generate a server consolidation model for each server category (server functionality and platform) at 860 (See FIG. 5). The gross computing capacity, baseline current generation CPUs and revised baseline current generation CPUs are determined with 100% utilization assumed. However, often, the actual % utilization does not approach 100%. A server consolidation model takes into account factors that affect the actual utilization of the existing server, CPUs, etc.

One factor to consider is the ability of the servers to be consolidated. Each server is analyzed to determine various server characteristics, such as usage, % utilization, number of CPUs, redundancies in usage, etc. to determine what % of the servers can be consolidated at 862. For example, 80% of existing servers in category W (web server) is determined as capable of being consolidated. The % server capable of being consolidated may differ based on server functionality and platform. From the determine % of servers capable of being consolidated, the total number of servers that can be consolidated (and thus total number of server that cannot be consolidated) are determined.

Using the % server consolidation determined at 862, a normalized current capacity, which is the total number of CPUs from the servers that can be consolidated, is determined using Equation (11). For example, FIG. 6 illustrates that from the existing gross capacity, measurable by 82 current generation CPUs, for Linux web server, 80% can be consolidated. Thus, 82×80%=66 current generation CPUs worth of gross capacity can be consolidated.

$$NCC = RBC(Y) \times PSC \quad (11)$$

NCC=normalized current capacity
RBC=revised baseline current generation CPUs
Y=specific server category (e.g., Linux platform under Web Server)
PSC=percent server capable of being consolidated The determined normalized current capacity is adjusted for another factor, target utilization, affecting server consolidation at 866. The existing servers are analyzed to determine the % utilization for each server. For example, FIG. 6 illustrates a 15% CPU utilization for Linux web servers. In general, the industry accepted peak average CPU utilization is 60%. Thus, CPU utilization for each CPU can be increase to 60% from the current rate of 15%. A ratio of current CPU utilization (15%) over peak average CPU utilization (60%) is determined to provide a utilization factor for reducing the normalized current capacity using Equation (6). In the example shown in FIG. 6, the normalized capacity for Linux web servers is reduced from 66 CPUs to 16 (rounded to the nearest whole CPU).

$$U = (CUR/PA) \times NCC \quad (6)$$

U=utilization of CPUs desired
CUR=current utilization rate
PA=peak average CPU utilization
NCC=normalized current capacity The capacity adjusted for utilization is further adjusted for workload at 868, including fragmentation of workload, overhead for failover, and added buffer for error in capacity measurement. Workload fragmentation, for example, describes inefficiency of a particular workload (e.g., function) that may be spread out or fragmented over several servers. While such workload fragmentation provides an opportunity to consolidate, the workload fragmentation may not be avoided. In general, the industry accepted % workload fragmentation is 15% (See FIG. 6). Using Equation (7), the capacity adjusted for utilization, 16 CPUs, is adjusted for 15% workload fragmentation is 19 CPUs. The capacity adjusted for workload fragmentation is also adjusted for a failover rate of 25% (See FIG. 6) using Equation (7). The resultant capacity adjusted for failover is 24 CPUs. Further, the capacity adjusted for failover is adjusted for possible error in capacity measurement using Equation (8).

$$ACF=U/(1-FR) \quad (7)$$

ACF=adjusted capacity for fragmentation
U=utilization of CPUs desired
FR=fragmentation rate The capacity adjusted for workload, including workload fragmentation, failover, and added buffer is used to determine a consolidated number of logical servers and a number of physical servers required to satisfy consolidated number of logical servers at 870. The number of consolidated number of logical servers and the number of physical servers are used to determine a target environment for consolidated and unconsolidated servers at 872.

In one implementation, the consolidation and rationalization modeling system 10 is implemented to take advantage of data flow-through techniques of Microsoft Excel spreadsheet to perform all calculations described above. The technical model module 112 can be implemented on one Excel spreadsheet file while the financial model module 114 can be implemented on a second Excel spreadsheet file. The two Excel spreadsheet files are linked together, whereby multiple output data from the technical model module 112 spreadsheet flows through to the financial model module 114 spreadsheet. Thus, a single change in one spreadsheet or worksheet creates a domino effect on all other spreadsheets or worksheets. In addition, within each Excel spreadsheet, multiple worksheets are implemented to separate one type of data calculation from another. For example, the technical model module 112 spreadsheet can include 15 worksheets, one for each category of server types.

In an alternate implementation, the consolidation and rationalization modeling system 10 may be implemented on other types of spreadsheet software including Microsoft Access, Corel Quattro Pro, and Lotus 1-2-3.

In yet another implementation, the consolidation and rationalization modeling system 10 may be implemented using computer programming language tools including Visual Basic, C/C++, C#, Assembler, Perl, and Java/Java Script. For example, C++ can be implemented to develop a variety of applications to perform each individual calculation portions. The 15 worksheets can be implemented as 15 individual applications, and the technical model module 112 and the financial model module 114 can be implemented as two central applications that are associated with the corresponding individual applications. Instead of using linked worksheets and linked spreadsheets, a call function embedded into the applications can be used to select, load, and execute all applications in desired fashions.

In one implementation, the data input/output and processing can be facilitated by a user interface implemented in the data processing system 130. The user interface can be a combination of hardware and software, whereby the user input of data and subsequent data manipulations are facilitated. One or more of an interface windows on a display device with buttons, menus, icons, hyperlinks, pop-up windows, tabs, and other similar interfaces can be implemented. User input hardware can include a keyboard, a mouse, a touch screen, a stylus, a dial, a track ball, a rocker, and other pointer devices.

The spreadsheet software, computer programming language tools, and user interface can be implemented on a computer system including a processor, a storage device, a display device, an input device, and an output device. The computer system may include a personal computer, a network server computer, or a portable computing devices such as a PDA, a pocket PC, or a smart phone.

In one implementation, the server consolidation and rationalization modeling system 10 may be implemented on one or more servers. Multiple users may communicate with the one or more servers using standard Internet Protocol (IP) or standard secured protocols such as Internet Protocol Security (IPSec) protocol. A web interface may be implemented to facilitate user interface with the consolidation and rationalization modeling system 10 implemented on the one or more servers. The web interface may include one or more graphical user interfaces described above. Implementing the consolidation and rationalization modeling system 10 on one or more servers eliminates the need for each user to store it on a separate personal computer, and thus reduces extra computing costs. Using the web interface, multiple users may access the consolidation and rationalization modeling system 10 using a personal computer, a network terminal computer, or a portable computing devices such as a PDA, a pocket PC, or a smart phone. In addition, having a centralized consolidation and rationalization modeling system 10 facilitates updates and revisions to the system by reducing the number of copies of the system.

Embodiments of the subject matter and the functional operations described in this specification can be implemented in digital electronic circuitry, or in computer software, firmware, or hardware, including the structures disclosed in this specification and their structural equivalents, or in the combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above does not require separation in all embodiments, and the described program components and systems can generally be integrated together in a single software product or packaged into multiple software products.

Various implementations of the disclosure have been described. Nevertheless, various modifications may be made without departing from the scope of the disclosure and the following claims.

What is claimed is:

1. A computer program product, encoded on a machine-readable storage device, operable to cause data processing apparatus to perform operations comprising:

receiving data from a user, the data describing an existing computing environment;

processing the data to generate baseline server information for the existing computing environment;

adjusting the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization; and generating one or more server consolidation models based on the adjusted baseline server information, wherein processing the data to generate baseline server information for the existing computing environment comprises:

normalizing the data across multiple, different server vendors;

determining a baseline server count for each combination of server functionality type and server platform type in the existing computing environment; and determining a baseline processor count for each combination of server functionality type and server platform type in the existing computing environment;

wherein adjusting the baseline server information comprises:

determining an adjusted baseline server count for each combination of server functionality type and server platform type in the existing computing environment; and determining an adjusted baseline processor count for each combination of server functionality type and server platform type in the existing computing environment;

wherein generating one or more server consolidation models based on the adjusted baseline server information comprises:

determining gross computing capacity for each combination of server functionality type and server platform type in the existing computing environment;

determining a number of current generation processors needed at one hundred percent utilization for each combination of server functionality type and server platform type in the existing computing environment;

determining a revised number of current generation processors needed at a revised percentage of utilization for each combination of server functionality type and server platform type in the existing computing environment; and generating one or more server consolidation models for each combination of server functionality type and server platform type in the existing computing environment based on the revised number of current generation processors needed at the revised percentage of utilization for each combination of server functionality type and server platform type in the existing computing environment.

2. The computer program product of claim 1, wherein processing the data comprises one or more of organizing, converting and sorting.

3. The computer program product of claim 1, further operable to cause data processing apparatus to perform operations comprising receiving the data to determine existing physical and logical server infrastructures including a total number of physical servers and a total number of logical servers.

4. The computer program product of claim 3, further operable to cause data processing apparatus to perform operations comprising organizing the received data based on a plurality of server identification information including at least one of a server functionality, a total number of processors present in each server, a server type, a platform type, a number of operating system resident on each server, and a processor speed.

5. The computer program product of claim 4, further operable to cause data processing apparatus to perform operations comprising filtering the received data to identify and correct errors.

6. The computer program product of claim 4, further operable to cause data processing apparatus to perform operations comprising converting the organized data to a format suitable for an optimization system to receive and process.

7. The computer program product of claim 6, further operable to cause data processing apparatus to perform operations comprising converting the processor speed as a gross Megahertz value by multiplying the processor speed by a total number of processors resident in each physical server.

8. The computer program product of claim 6, further operable to cause data processing apparatus to perform operations comprising sorting the physical servers based on the server type.

9. The computer program product of claim 8, further operable to cause data processing apparatus to perform operations comprising sorting the physical servers based on the platform type.

10. The computer program product of claim 9, further operable to cause data processing apparatus to perform operations comprising determining a baseline number of current generation processors needed to satisfy an overall gross performance requirement for the server type.

11. The computer program product of claim 10, further operable to cause data processing apparatus to perform operations comprising dynamically updating the determined baseline number of current generation processors by adjusting a scaling factor.

12. The computer program product of claim 10, further operable to cause data processing apparatus to perform operations comprising performing server consolidation based on the baseline server information.

13. The computer program product of claim 12, further operable to cause data processing apparatus to perform operations comprising determining a total number of servers that can be consolidated.

14. The computer program product of claim 1, further operable to cause data processing apparatus to perform operations comprising determining a total number of processors that can be consolidated.

15. The computer program product of claim 14, further operable to cause data processing apparatus to perform operations comprising adjusting a processor utilization rate to determine a capacity adjusted number of processors.

16. The computer program product of claim 15, further operable to cause data processing apparatus to perform operations comprising determining a workload adjusted number of processors based on at least one of a fragmentation of workload, a percentage of high available overhead servers for failover, and a margin or error.

17. The computer program product of claim 16, further operable to cause data processing apparatus to perform operations comprising reducing the total number of logical servers through virtualization.

18. The computer program product of claim 16, further operable to cause data processing apparatus to perform operations comprising reducing the total number of physical servers based on the workload adjusted number of processors and a selected server size.

19. The computer program product of claim 12, further operable to cause data processing apparatus to perform operations comprising determining a total number of servers that cannot be consolidated.

20. The computer program product of claim 12, further operable to cause data processing apparatus to perform operations comprising determining a total cost savings based on the server consolidation performed by a technical model module.

21. The computer program product of claim 20, further operable to cause data processing apparatus to perform operations comprising dynamically recalculating the total cost savings based on one or more key parameters including an efficiency factor.

22. The computer program product of claim 1 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization comprises:

determining a current processor utilization rate, a peak average processor utilization rate, and a normalized current capacity of processors in the existing computing environment; and computing a utilization of processors desired by dividing the current processor utilization rate by the peak average processor utilization rate and multiplying a product of the division by the normalized current capacity of processors in the existing computing environment.

23. The computer program product of claim 22 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:

determining a workload fragmentation rate; and computing an adjusted capacity for fragmentation by dividing the computed utilization of processors desired by a result of subtracting the workload fragmentation rate from one.

24. The computer program product of claim 1 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:

adjusting the baseline server information to account for overhead capacity needed to compensate for processor failures.

25. A computer program product, encoded on a machine-readable storage device, operable to cause data processing apparatus to perform operations comprising:

receiving data from a user, the data describing an existing computing environment;

processing the data to generate baseline server information for the existing computing environment;

adjusting the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization; and generating one or more server consolidation models based on the adjusted baseline server information, wherein adjusting the baseline server information and generating one or more server consolidation models based on the adjusted baseline server information comprises:

determining a percentage of servers in the existing computing environment that are capable of being consolidated;

determining a normalized current capacity of processors in the existing computing environment based on the percentage of servers in the existing computing environment that are capable of being consolidated;

determining a first adjusted capacity of processors that is adjusted for target utilization based on the normalized current capacity of processors in the existing computing environment, current processor utilization in the existing computing environment, and peak average processor utilization;

determining a second adjusted capacity of processors that is adjusted for workload based on the first adjusted capacity of processors, workload fragmentation expected, overhead capacity needed to compensate for processor failures, and error in capacity measurement;

determining a consolidated number of logical servers and a number of physical servers needed to satisfy the consolidated number of logical servers based on the second adjusted capacity of processors; and determining a target environment for consolidated and unconsolidated servers based on the consolidated number of logical servers and the number of physical servers needed to satisfy the consolidated number of logical servers.

26. A method comprising:

receiving data from a user, the data describing an existing computing environment;

processing the data to generate baseline server information for the existing computing environment;

adjusting, by at least one processor, the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization;

generating one or more server consolidation models based on the adjusted baseline server information; and generating a recommendation based on the generated one or more server consolidation models, wherein processing the data to generate baseline server information for the existing computing environment comprises:

normalizing the data across multiple, different server vendors;

determining a baseline server count for each combination of server functionality type and server platform type in the existing computing environment; and determining a baseline processor count for each combination of server functionality type and server platform type in the existing computing environment;

wherein adjusting the baseline server information comprises:

determining an adjusted baseline server count for each combination of server functionality type and server platform type in the existing computing environment; and determining an adjusted baseline processor count for each combination of server functionality type and server platform type in the existing computing environment;

wherein generating one or more server consolidation models based on the adjusted baseline server information comprises:

determining gross computing capacity for each combination of server functionality type and server platform type in the existing computing environment;

determining a number of current generation processors needed at one hundred percent utilization for each combination of server functionality type and server platform type in the existing computing environment;

determining a revised number of current generation processors needed at a revised percentage of utilization for each combination of server functionality type and server platform type in the existing computing environment; and generating one or more server consolidation models for each combination of server functionality type and server platform type in the existing computing environment based on the revised number of current generation processors needed at the revised percentage of utilization for each combination of server functionality type and server platform type in the existing computing environment.

27. The method of claim 26, wherein processing the data comprises one or more of organizing, converting, and sorting.

28. The method of claim 26, wherein receiving the data further comprises receiving information to determine existing physical and logical server infrastructures including a total number of physical servers and a total number of logical servers.

29. The method of claim 28, wherein sorting the data further comprises sorting the physical servers based on a server type.

30. The method of claim 29, wherein organizing, converting, and sorting the data further comprises determining a baseline number of current generation processors needed to satisfy an overall gross performance requirement for the server type.

31. The method of claim 30, wherein generating one or more server consolidation models further comprises determining a total number of servers that can be consolidated.

32. The method of claim 31, wherein generating one or more server consolidation models further comprises reducing the total number of logical servers through virtualization.

33. The method of claim 32, wherein generating one or more server consolidation models further comprises generating a total cost savings.

34. The method of claim 26 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization comprises:

determining a current processor utilization rate, a peak average processor utilization rate, and a normalized current capacity of processors in the existing computing environment; and computing a utilization of processors desired by dividing the current processor utilization rate by the peak average processor utilization rate and multiplying a product of the division by the normalized current capacity of processors in the existing computing environment.

35. The method of claim 34 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:

determining a workload fragmentation rate; and computing an adjusted capacity for fragmentation by dividing the computed utilization of processors desired by a result of subtracting the workload fragmentation rate from one.

36. The method of claim 26 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:

adjusting the baseline server information to account for overhead capacity needed to compensate for processor failures.

37. A method comprising:

receiving data from a user, the data describing an existing computing environment;

processing the data to generate baseline server information for the existing computing environment;

adjusting, by at least one processor, the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization;

generating one or more server consolidation models based on the adjusted baseline server information; and generating a recommendation based on the generated one or more server consolidation models wherein adjusting the baseline server information and generating one or more server consolidation models based on the adjusted baseline server information comprises:

determining a percentage of servers in the existing computing environment that are capable of being consolidated;

determining a normalized current capacity of processors in the existing computing environment based on the percentage of servers in the existing computing environment that are capable of being consolidated;

determining a first adjusted capacity of processors that is adjusted for target utilization based on the normalized current capacity of processors in the existing computing environment, current processor utilization in the existing computing environment, and peak average processor utilization;

determining a second adjusted capacity of processors that is adjusted for workload based on the first adjusted capacity of processors, workload fragmentation expected, overhead capacity needed to compensate for processor failures, and error in capacity measurement;

determining a consolidated number of logical servers and a number of physical servers needed to satisfy the consolidated number of logical servers based on the second adjusted capacity of processors; and determining a target environment for consolidated and unconsolidated servers based on the consolidated number of logical servers and the number of physical servers needed to satisfy the consolidated number of logical servers.

38. A system comprising:

at least one processor; and at least one machine-readable storage device coupled to the at least one processor having instructions stored thereon which, when executed by the at least one processor, causes the at least one processor to perform operations comprising:
  receiving data from a user, the data describing an existing computing environment;
  processing the data to generate baseline server information for the existing computing environment;
  adjusting the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization; and
  generating one or more server consolidation models based on the adjusted baseline server information,
wherein processing the data to generate baseline server information for the existing computing environment comprises:
  normalizing the data across multiple, different server vendors;
  determining a baseline server count for each combination of server functionality type and server platform type in the existing computing environment; and
  determining a baseline processor count for each combination of server functionality type and server platform type in the existing computing environment;
wherein adjusting the baseline server information comprises:
  determining an adjusted baseline server count for each combination of server functionality type and server platform type in the existing computing environment; and
  determining an adjusted baseline processor count for each combination of server functionality type and server platform type in the existing computing environment;
wherein generating one or more server consolidation models based on the adjusted baseline server information comprises:
  determining gross computing capacity for each combination of server functionality type and server platform type in the existing computing environment;
  determining a number of current generation processors needed at one hundred percent utilization for each combination of server functionality type and server platform type in the existing computing environment;
  determining a revised number of current generation processors needed at a revised percentage of utilization for each combination of server functionality type and server platform type in the existing computing environment; and
  generating one or more server consolidation models for each combination of server functionality type and server platform type in the existing computing environment based on the revised number of current generation processors needed at the revised percentage of utilization for each combination of server functionality type and server platform type in the existing computing environment.

39. The system of claim 38 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization comprises:
  determining a current processor utilization rate, a peak average processor utilization rate, and a normalized current capacity of processors in the existing computing environment; and
  computing a utilization of processors desired by dividing the current processor utilization rate by the peak average processor utilization rate and multiplying a product of the division by the normalized current capacity of processors in the existing computing environment.

40. The system of claim 39 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:
  determining a workload fragmentation rate; and
  computing an adjusted capacity for fragmentation by dividing the computed utilization of processors desired by a result of subtracting the workload fragmentation rate from one.

41. The system of claim 38 wherein adjusting the baseline server information to account for the difference between current processor utilization in the existing computing environment and peak average processor utilization and to account for workload fragmentation expected after the baseline server information has been adjusted to account for the difference between current processor utilization in the existing computing environment and peak average processor utilization further comprises:
  adjusting the baseline server information to account for overhead capacity needed to compensate for processor failures.

42. A system comprising:
at least one processor; and
at least one machine-readable storage device coupled to the at least one processor having instructions stored thereon which, when executed by the at least one processor, causes the at least one processor to perform operations comprising:
  receiving data from a user, the data describing an existing computing environment;
  processing the data to generate baseline server information for the existing computing environment;
  adjusting the baseline server information to account for a difference between current processor utilization in the existing computing environment and peak average processor utilization and to account for workload fragmentation expected after the baseline server information has been adjusted to account for the difference between current processor utilization in the existing computing environment and peak average processor utilization; and
  generating one or more server consolidation models based on the adjusted baseline server information,
wherein adjusting the baseline server information and generating one or more server consolidation models based on the adjusted baseline server information comprises:

determining a percentage of servers in the existing computing environment that are capable of being consolidated;

determining a normalized current capacity of processors in the existing computing environment based on the percentage of servers in the existing computing environment that are capable of being consolidated;

determining a first adjusted capacity of processors that is adjusted for target utilization based on the normalized current capacity of processors in the existing computing environment, current processor utilization in the existing computing environment, and peak average processor utilization;

determining a second adjusted capacity of processors that is adjusted for workload based on the first adjusted capacity of processors, workload fragmentation expected, overhead capacity needed to compensate for processor failures, and error in capacity measurement;

determining a consolidated number of logical servers and a number of physical servers needed to satisfy the consolidated number of logical servers based on the second adjusted capacity of processors; and determining a target environment for consolidated and unconsolidated servers based on the consolidated number of logical servers and the number of physical servers needed to satisfy the consolidated number of logical servers.

43. The system of claim 38, wherein processing the data comprises one or more of organizing, converting, and sorting.

44. The system of claim 38, wherein receiving the data further comprises receiving information to determine existing physical and logical server infrastructures including a total number of physical servers and a total number of logical servers.

45. The system of claim 44, wherein sorting the data further comprises sorting the physical servers based on a server type.

46. The system of claim 45, wherein organizing, converting, and sorting the data further comprises determining a baseline number of current generation processors needed to satisfy an overall gross performance requirement for the server type.

47. The system of claim 46, wherein generating one or more server consolidation models further comprises determining a total number of servers that can be consolidated.

48. The system of claim 47, wherein generating one or more server consolidation models further comprises reducing the total number of logical servers through virtualization.

49. The system of claim 48, wherein generating one or more server consolidation models further comprises generating a total cost savings.

* * * * *

UNITED STATES PATENT AND TRADEMARK OFFICE
CERTIFICATE OF CORRECTION

PATENT NO. : 7,761,548 B2 Page 1 of 1
APPLICATION NO. : 11/552422
DATED : July 20, 2010
INVENTOR(S) : Marc E. Snyder It is certified that error appears in the above-identified patent and that said Letters Patent is hereby corrected as shown below:

Title Page, OTHER PUBLICATIONS section, line 1 delete "Availablity" and insert -- Availability --, therefor.

Column 24, line 34 after "models" insert -- , --.

Signed and Sealed this

Seventh Day of December, 2010

David J. Kappos
*Director of the United States Patent and Trademark Office*